United States Patent
Hai et al.

(10) Patent No.: US 11,301,666 B2
(45) Date of Patent: Apr. 12, 2022

(54) LIGHT COLLIMATING STRUCTURE, MANUFACTURING METHOD THEREOF AND OPTICAL FINGERPRINT IDENTIFICATION APPARATUS

(71) Applicant: BOE TECHNOLOGY GROUP CO., LTD., Beijing (CN)

(72) Inventors: Xiaoquan Hai, Beijing (CN); Haisheng Wang, Beijing (CN); Yingming Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 313 days.

(21) Appl. No.: 16/493,136

(22) PCT Filed: Apr. 25, 2019

(86) PCT No.: PCT/CN2019/084299
§ 371 (c)(1),
(2) Date: Sep. 11, 2019

(87) PCT Pub. No.: WO2020/029607
PCT Pub. Date: Feb. 13, 2020

(65) Prior Publication Data
US 2021/0334507 A1    Oct. 28, 2021

(30) Foreign Application Priority Data
Aug. 9, 2018   (CN) .......................... 201810903978.7

(51) Int. Cl.
*G06K 9/00*   (2006.01)
*G02B 27/30*   (2006.01)

(52) U.S. Cl.
CPC ......... *G06K 9/00046* (2013.01); *G02B 27/30* (2013.01)

(58) Field of Classification Search
CPC ................ G06K 9/00046; G02B 27/30; G06F 3/042–0428
See application file for complete search history.

(56) References Cited

U.S. PATENT DOCUMENTS

2016/0132712 A1   5/2016   Yang et al.
2016/0224816 A1   8/2016   Smith et al.
(Continued)

FOREIGN PATENT DOCUMENTS

CN   105550664 A   5/2016
CN   107330426 A   11/2017
(Continued)

OTHER PUBLICATIONS

International Search Report dated Jul. 25, 2019, issued in Application No. PCT/CN2019/084299 (11 pages).
(Continued)

*Primary Examiner* — Stephen G Sherman
(74) *Attorney, Agent, or Firm* — WHDA, LLP

(57) ABSTRACT

The embodiments of the present disclosure relate to a light collimating structure. The light collimating structure may include a plurality of stacked base substrates in a first direction and a pinhole film between two adjacent base substrates. The pinhole film comprises a plurality of light-passing openings in a second direction configured to allow light within a half-light receiving angle to pass through the light-passing openings.

19 Claims, 14 Drawing Sheets

(56) References Cited

U.S. PATENT DOCUMENTS

2016/0254312 A1* 9/2016 Lee ........................ G02B 27/30
                                                    382/125
2017/0124370 A1   5/2017 He et al.
2018/0175125 A1* 6/2018 Chung ................ H01L 27/3234

FOREIGN PATENT DOCUMENTS

| CN | 107798278 A | 3/2018 |
| CN | 108227230 A | 6/2018 |
| CN | 108960208 A | 12/2018 |

OTHER PUBLICATIONS

Office Action dated Mar. 27, 2020, issued in counterpart CN application No. 201810903978.7, with English translation. (23 pages).

* cited by examiner

LIGHT COLLIMATING STRUCTURE, MANUFACTURING METHOD THEREOF AND OPTICAL FINGERPRINT IDENTIFICATION APPARATUS

CROSS-REFERENCE TO RELATED APPLICATIONS

This application claims benefit of the filing date of Chinese Patent Application No. 201810903978.7 filed on Aug. 9, 2018, the disclosure of which is hereby incorporated in its entirety by reference.

TECHNICAL FIELD

The present disclosure relates to display technology, and more particularly, to a light collimating structure, a manufacturing method thereof, and an optical fingerprint identification apparatus.

BACKGROUND

In the process of optical fingerprint identification, when the distance between the finger and the sensor is large, the scattering of the light reflected by the finger may blur the acquired image. As a result, the fingerprint information recognized based on the light received by the sensor may not be accurate.

BRIEF SUMMARY

An embodiment of the present disclosure provides a light collimating structure. The light collimating structure may include a plurality of stacked base substrates in a first direction and a pinhole film between two adjacent base substrates. The pinhole film comprises a plurality of light-passing openings in a second direction configured to allow light within a half-light receiving angle to pass through the light-passing openings.

Optionally, the pinhole film comprises a first pinhole sub-film and a second pinhole sub-film, the first pinhole sub-film comprises a plurality of first grooves, the second pinhole sub-film comprises a plurality of second grooves, each of the first grooves in the first pinhole sub-film is corresponding to one of the plurality of second grooves in the second sub-film, each of the first grooves and the corresponded one of the plurality of second grooves are oppositely disposed to form one of the light-passing openings.

Optionally, a cross-section of each of the first and the second grooves in a plane perpendicular to one of the two adjacent base substrates is in a shape of an isosceles right triangle, the half-light-receiving angle θ satisfies the following relationship:

$$\theta = \sqrt{2}d/h$$

wherein θ is the half-light-receiving angle, d is a leg length of the isosceles right triangle, and h is a groove length in the second direction.

Optionally, a pitch between adjacent light-passing openings in the pinhole film between the two adjacent base substrates satisfies the following relationship:

$$p = \frac{1}{\sqrt{2}}d + k$$

wherein the two adjacent base substrates have a same thickness, p is the pitch between adjacent light-passing openings and k is a thickness of one of the two adjacent base substrates.

Optionally, the first pinhole sub-film and the second pinhole sub-film have a same thickness u, the pinhole film has a thickness 2u, and u and d satisfy the following relationship:

$$d = \sqrt{2}u$$

Optionally, a cross-section of each of the first and the second grooves in a plane perpendicular to one of the two adjacent base substrates is in a shape of a semicircle, and the half-light-receiving angle θ satisfies the following relationship:

$$\theta = 2R/h$$

wherein θ is the half-light-receiving angle, and it is a radius of the semicircle, and h is a groove length in the second direction.

Optionally, the first pinhole sub-film and the second pinhole sub-film have a same thickness u, the pinhole film has a thickness 2u, and u and the radius K of the semicircle satisfy the following relationship:

$$R = u$$

Optionally, a pitch between adjacent light-passing openings in the pinhole film between the two adjacent base substrates is:

$$p = 2R + k,$$

wherein the two adjacent base substrates have a same thickness, p is the pitch between adjacent light passing openings, and k is a thickness of one of the adjacent two base substrates.

Optionally, the plurality of first grooves and the plurality of second grooves are filled with a transparent material.

Optionally, the pinhole film and the plurality of base substrates are made of a black light-absorbing material or a material that absorbs light of a first range of wavelengths, the first range of wavelengths being from 380 nm to 780 nm.

Optionally, a layer of adhesive is further between the first pinhole sub-film and the second pinhole sub-film and the first pinhole sub-film and the second pinhole sub-film are attached together by the layer of adhesive.

Optionally, the layer of adhesive is made of a black light-absorbing material and has a thickness of about 0.1000 angstroms or less.

Optionally, the pinhole film is made of a material having static electricity, and the first pinhole sub-film and the second pinhole sub-film are electrostatically attached together.

Another example of the present disclosure is an optical fingerprint identification apparatus. The optical fingerprint identification apparatus may include a light emitting apparatus, configured for emitting light being reflected by a fingerprint when fingerprinting identification is performed; the light collimating structure according to one embodiment of the present disclosure under the light emitting apparatus, configured for receiving and transmitting the light reflected by the fingerprint; and a sensor below the light collimating structure, configured for receiving the light transmitted via the light collimating structure.

Another example of the present disclosure is a method of manufacturing a light collimating structure. The method of manufacturing a light collimating structure may include forming a first pinhole sub-film and a second pinhole sub-film on a first side and a second side of each of a plurality of base substrates respectively; forming a plurality of first grooves on the first pinhole sub-film and a plurality of second grooves on the second pinhole sub-film of each of the plurality of base substrates to form a plurality of multi-pinhole units; and attaching the plurality of multi-pinhole units to one another such that the plurality of first grooves and the plurality of second grooves in two adjacent multi-pinhole units are configured to be oppositely disposed to form a plurality of light-passing openings, thereby allowing light within a half-light-receiving angle to pass through the light-passing openings.

Optionally, forming the plurality of first grooves on the first pinhole sub-film and the plurality of second grooves on the second pinhole sub-film to form the plurality of multi-pinhole units comprises forming the plurality of first grooves on the first pinhole sub-film and the plurality of second grooves on the second pinhole sub-film by a nano-imprinting technique or an exposure technique.

Optionally, attaching the plurality of multi-pinhole units to one another comprises providing a layer of adhesive on the first pinhole sub-film and the second pinhole sub-film of each of the plurality of the multi-pinhole units and attaching the plurality of multi-pinhole units together by the layer of adhesive.

Optionally, the pinhole films are made of a material having static electricity; and attaching the plurality of multi-pinhole units to one another comprises: attaching the plurality of multi-pinhole units together by the static electricity of the pinhole films.

Optionally, a cross-section of each of the plurality of first grooves and the plurality of second grooves in a plane perpendicular to the plurality base substrates is in a shape of an isosceles right triangle or a semicircle.

Optionally, the method further comprises filling the plurality of first grooves and the plurality of second grooves with a transparent material.

BRIEF DESCRIPTION OF THE DRAWINGS

The above and other features and advantages of the present disclosure will become more apparent from the detailed description of exemplary embodiments. It is apparent that the drawings in the following description are only some of the embodiments of the present disclosure, and other drawings may be obtained from those skilled in the art without departing from the drawings. In the drawings.

DETAILED DESCRIPTION

Figure 1:
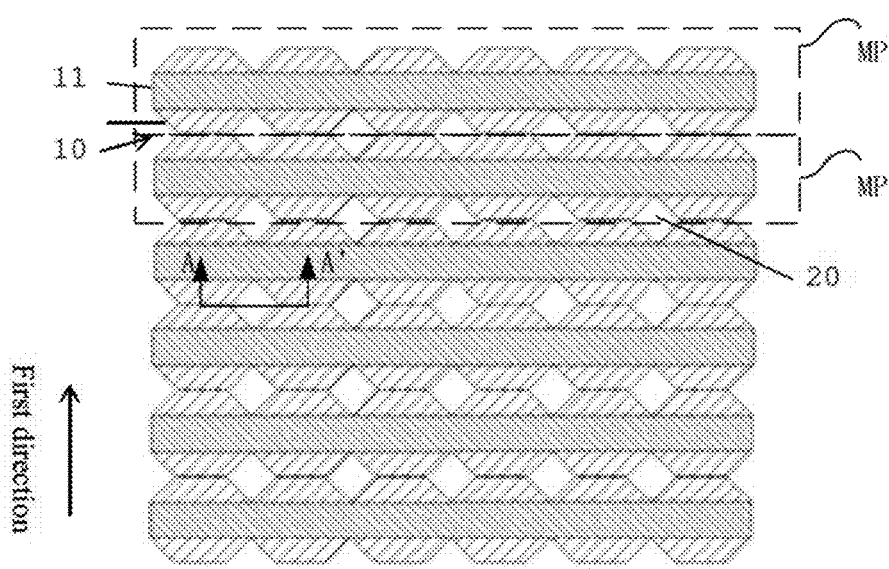
FIG. 1 shows a top view of a light collimating structure in accordance with one exemplary embodiment of the present disclosure.

Exemplary embodiments will now be described more fully with reference to the accompanying drawings. However, the exemplary embodiments can be embodied in a variety of forms and should not be construed as being limited to the embodiments set forth herein. On the contrary, those embodiments provided make the disclosure comprehensive and complete and convey all the ideas of the exemplary embodiments to those skilled in the art. The described features, structures, or characteristics may be combined in any suitable manner in one or more embodiments. In the following description, numerous specific details are set forth and provide the full understanding of the embodiments of the present disclosure. However, one skilled in the art will appreciate that the technical solution of the present disclosure may be practiced without one or more of the specific details, or may employ other methods, components, materials, apparatuses, steps, etc. In other instances, well-known technical solutions are not shown or described in detail to avoid obscuring aspects of the present disclosure.

In addition, the drawings are merely schematic illustrations of the present disclosure, and are not necessarily drawn to scale. The same reference numerals in the drawings denote the same or similar parts, and the repeated description thereof will be omitted.

Figure 15:
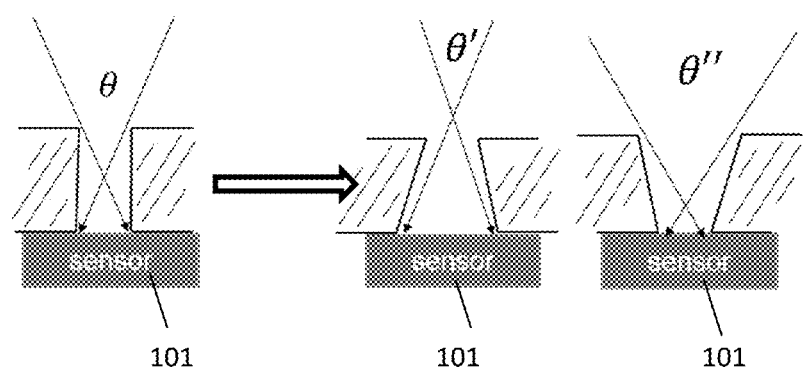
FIG. 15 shows a through-hole filtering method in the related art.

The sensing portion of the existing fingerprint identification includes a through-hole filtering method as shown in FIG. 15, or a lens plus diaphragm method. As shown in FIG. 15, by providing a through hole 102 in the material above the sensor 101, a half-receiving angle θ of the light incident on the sensor 101 is sufficiently small to distinguish the valley information from the ridge information of the fingerprint. To obtain a structure of an ideal through hole 102 as shown on the left side of FIG. 15, a specific material that can achieve a high depth-to-width ratio is required. However, in the existing process, a structure similar to 'chamfering' may occur in the lithography process, so that the light-receiving angle becomes large (as shown on the right side figure of FIG. 15), thereby causing crosstalk of adjacent valley and ridge information. As such, the identified fingerprint information is inaccurate, thereby blurring the acquired image. The lens-plus-diaphragm method also has problem of difficult processing.

Figure 2:
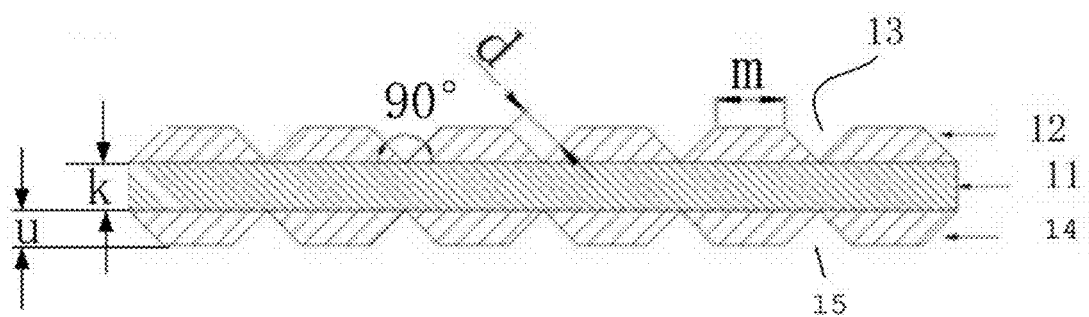
FIG. 2 is a top view of one of the MP units of FIG. 1.

FIG. 1 shows a top view of a light collimating structure in accordance with one exemplary embodiment of the present disclosure, and FIG. 2 is a top view of one multi-pinhole unit in FIG. 1. As shown in FIG. 1 and FIG. 2, the light collimating structure includes a plurality of stacked base substrates 11 in a first direction and a pinhole film 10 between two adjacent base substrates. The pin hole film 10 comprises a plurality of light-passing openings 20 in a second direction configured to allow light within a half-light receiving angle to pass through the light-passing openings.

The pinhole film 10 comprises a first pinhole sub-film 12 and a second pinhole sub-film 14. The first pinhole sub-film 12 comprises a plurality of first grooves 13, the second pinhole sub-film 14 comprises a plurality of second grooves 15. Each of the first grooves 13 in the first pinhole sub-film 12 is corresponding to one of the plurality of second grooves 15 in the second pinhole sub-film 14. Each of the first grooves 13 and the corresponded one of the plurality of second grooves 15 are oppositely disposed to form one of the light-passing openings 20.

Optionally, the light collimating structure includes a plurality of multi-pinhole (MP) units attached to one another. Each of the MP units includes a substrate 11 and a first pinhole sub-film (p film) 12 and a second pinhole sub-film 14. The substrate 11 has a first side and a second side. The first pinhole sub-film and the second pinhole sub-film are disposed on the first side and the second side of the substrate, respectively. The first grooves 13 and the second grooves 15 are formed on the first pinhole sub-film 12 and the second pinhole sub-film 14 respectively. Referring to FIG. 1, the first grooves 13 and the second grooves 15 on the first pinhole sub-film 12 and the second pinhole sub-film 14 respectively in the adjacent MP units are oppositely disposed to form a light-passing opening to allow light within a half-light-receiving angle of the MP units to pass through the light-passing opening. That is to say, the light in the range of half-light-receiving angle can pass through the light-passing opening to obtain a collimating effect. The light outside the range of half-light-receiving angle is blocked by the pinhole films of the MP units and accordingly cannot pass through the light-passing opening. In FIG. 1, a cross section of each of the first grooves and the second grooves on the pinhole film is, for example, an isosceles right triangle, and the first grooves and the second grooves on the pinhole films of adjacent MP units are oppositely disposed to form a square-shaped light-passing hole or opening.

Figure 3:
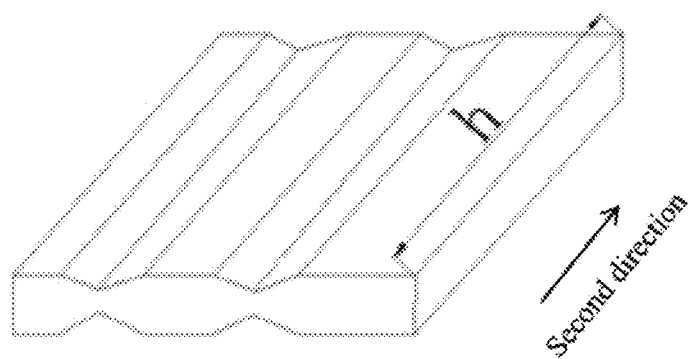
FIG. 3 is a partial enlarged view of a MP unit according to one embodiment of the present disclosure.
Figure 4:
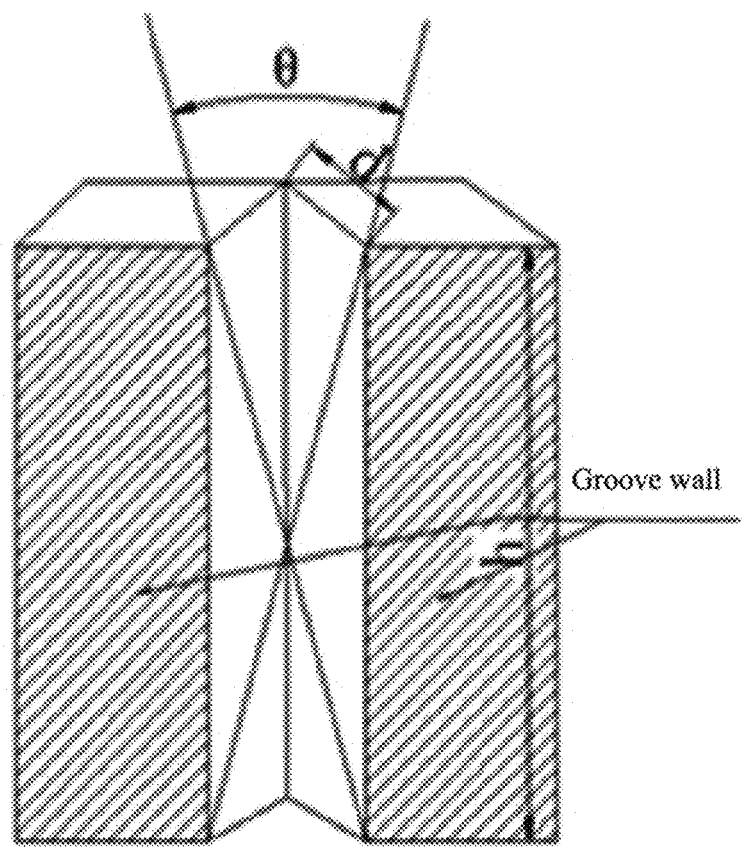
FIG. 4 shows a cross-sectional view taken along line A-A' in FIG. 1.

Referring to FIG. 2, the first pinhole sub-film and the second pinhole sub-film are provided with a plurality of first grooves and a plurality of second grooves distributed at intervals of the same size m, respectively. A cross section of each of the first grooves and the second grooves in a plane perpendicular to the substrate is an isosceles right triangle, and a length of a leg of the isosceles right triangle is d. A partial enlarged view of the MP unit is shown in FIG. 3. As shown in FIG. 3 a groove length is h, which is the length in the second direction or the orientation direction of the groove. FIG. 4 shows a cross-sectional view taken along line A-A' in FIG. 1, and the groove structure of the MP unit can be more clearly seen from FIG. 4.

With continued reference to FIG. 2, a thickness of the substrate 11 is k and a thickness of each of the first pinhole sub-film 12 and the second pinhole sub-film 14 is u. The angle between the two legs in the cross-section of the first groove and the second groove is 90 degrees. A length of the hypotenuse of the isosceles right triangle is $\sqrt{2}$ d. Referring to FIG. 1, a plurality of MP units constitutes equally spaced optical layers, and each MP unit corresponds to an optical layer. A thickness of the optical layer is the groove length h in the second direction. The first grooves and the second grooves of adjacent MP units form a light-passing hole having a square cross section.

In one embodiment, the first pinhole sub-film and the second pinhole sub-film have a same thickness u. The thickness u of the first pinhole sub-film or the second pinhole sub-film of the MP unit and a length d of a leg of the isosceles right triangle satisfy the following relationship:

$$d=\sqrt{2}u$$

The groove length h in the second direction and the leg length d of the isosceles right triangle limit the range of the half-light-receiving angle θ of the optical layer:

$$\theta=\sqrt{2}d/h$$

In one embodiment, as shown in FIG. 1, the pitch p between adjacent light-passing openings in the pinhole film between two adjacent base substrates is:

$$p = \frac{1}{\sqrt{2}}d + k$$

wherein the two adjacent base substrates have a same thickness, and k is a thickness of one of the two adjacent base substrates.

According to one embodiment, the pinhole film and the substrate may be made of a black light-absorbing material such as a black resin, or alight-absorbing material for absorbing light of a certain range of wavelengths (for example, light of 380 nm to 780 nm, depending on signal light used for fingerprint identification) or materials absorbing light of a specific wavelength.

In one embodiment, a layer of an adhesive is further disposed on the first pinhole sub-film and the second pinhole sub-film of each of the MP units, and the plurality of MP units are attached together by the layer of the adhesive. For example, as shown in FIG. 4, a black light-absorbing adhesive is applied to the wall of the first pinhole sub-film and the second pinhole sub-film on both sides of the substrate, and the layer of adhesive is very thin (for example, about 1000 angstroms or less) so that it does not affect the light path. Finally, the MP units are bonded into a light collimating structure as shown in FIG. 1. The black light-absorbing adhesive may be made of a polyacrylic-based material or a black light-absorbing material having a very thin thickness such as 1000 angstroms.

In one embodiment, the pinhole film is made of a material having static electricity, and the plurality of MP units is electrostatically attached together. For example, the pinhole film may be made of a film material with high electrostatic property such as black polyethylene (PE) or black Polyvinyl chloride (PVC), rather than being coated with an adhesive. Thus, the MP units produced may be electrostatically attached together, thereby eliminating the bonding process.

The optical simulation results of the light collimating structure according to some embodiments of the present disclosure are described below in conjunction with the embodiments.

A minimum half-light-receiving angle for separating the valley and ridge information of the fingerprint is here taken as 5.7 degrees. d takes the process limit value of 6 um, and h is 59 um. k takes the process limit value of 2 um. p is calculated to be 6.2 um according to equation (3). The parameters d, p, and groove length h of the above design are optically simulated to obtain optical simulation results as shown in FIG. 5.

Figure 5:
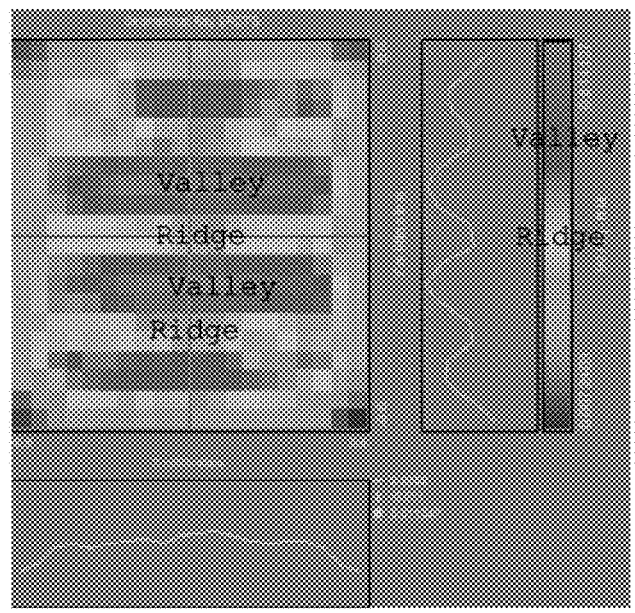
FIG. 5 shows optical simulation results of a light collimating structure shown in FIG. 1.

As shown in FIG. 5, the dark portion corresponds to the valley of the fingerprint, and the light portion corresponds to the ridge of the fingerprint. As shown in FIG. 5, the dark stripes are clearly spaced apart. It can be seen that the light collimating structure can extract the small angle of light out in a way close to collimation. Each ray of the extracted light can be accurately matched with the valley and ridge of the fingerprint, and there is no other stray light crosstalk. As such, accurate identification can be obtained. It should be noted that the thickness of the overall optical layer structure, that is, the groove length h in the second direction, is less than 60 um, which is lighter and thinner than the existing structure.

Figure 6:
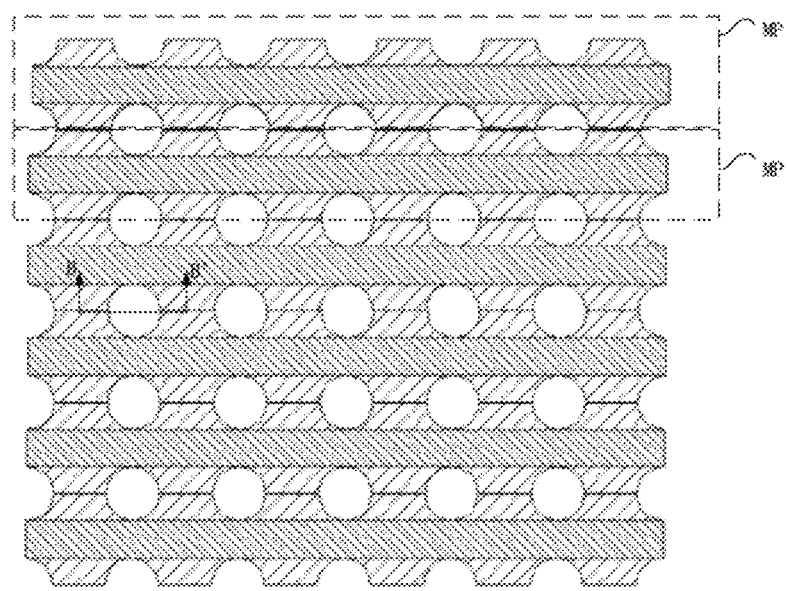
FIG. 6 shows a top view of a light collimating structure in accordance with one exemplary embodiment of the present disclosure.
Figure 7:
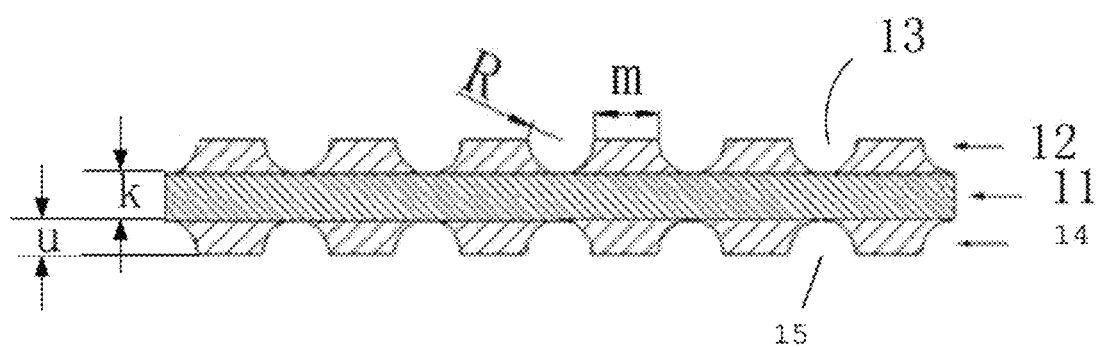
FIG. 7 is a top view of one oldie MP units in FIG. 6.

FIG. 6 illustrates a top view of a light collimating structure in accordance with one exemplary embodiment of the present disclosure, FIG. 7 is a top view of one MP unit of FIG. 6. The embodiment shown in FIG. 6 and FIG. 7 differs in that the embodiment shown in FIG. 6 and FIG. 7 has a semi-circular cross section of the first groove and the second groove on the first pinhole sub-film 12 and the second pinhole sub-film 14 respectively, instead of an isosceles right triangle.

Figure 8:
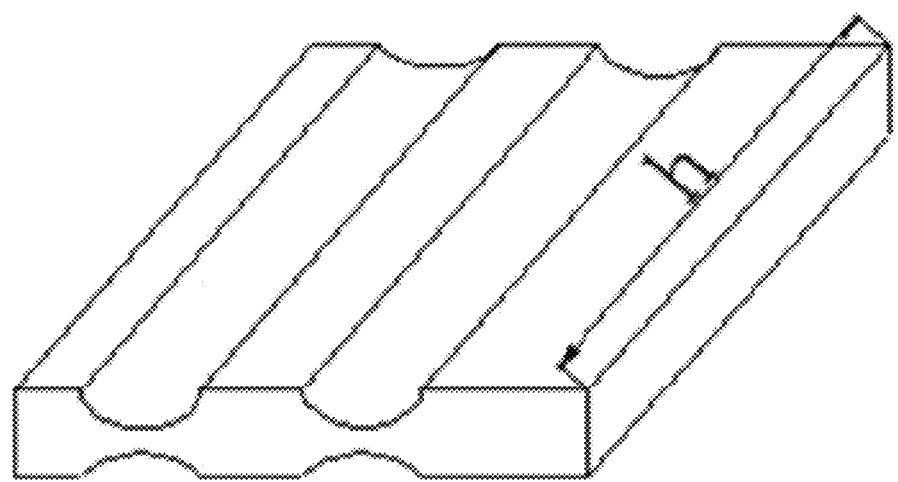
FIG. 8 is a partial enlarged view of a MP unit according to one embodiment of the present disclosure.
Figure 9:
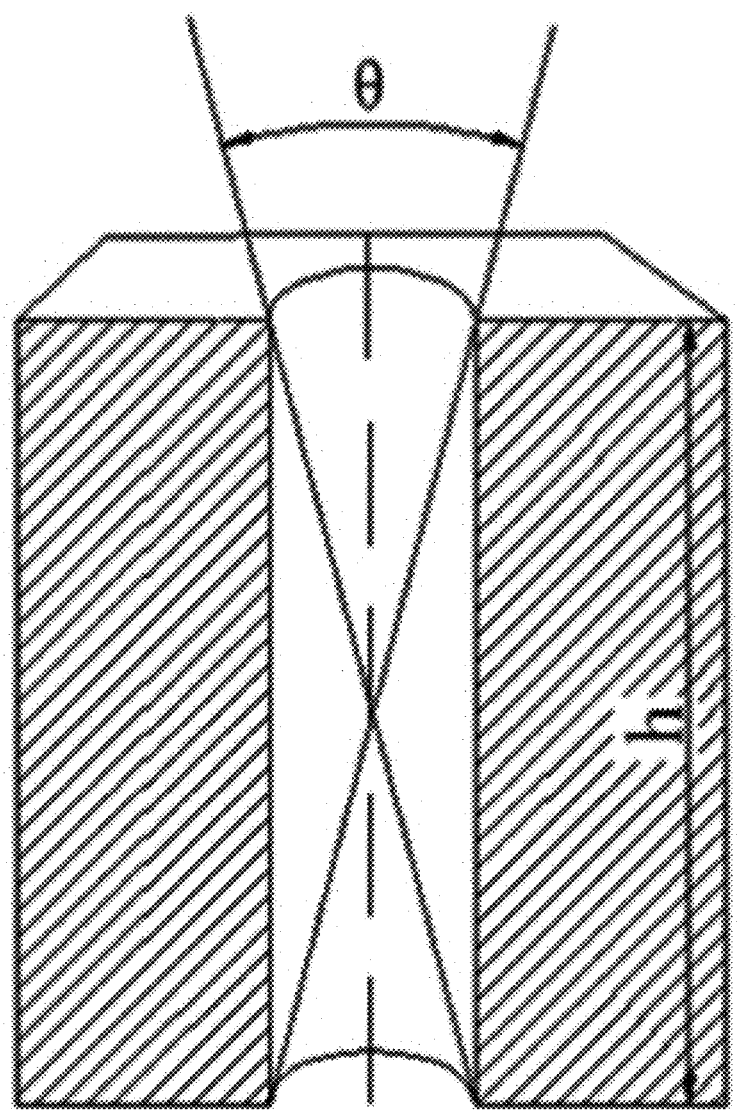
FIG. 9 shows a cross-sectional view taken along lire B-B' in FIG. 6.

Referring to FIG. 7, a radius of the semi-circle of the cross-section of the first groove or the second groove is R and the groove length is h. A partial enlarged view of the MP unit is shown in FIG. 8. As shown in FIG. 8, the groove length is the length in the second direction in which the groove is oriented. FIG. 9 shows a cross-sectional view taken along line B-B' in FIG. 6. As shown in FIG. 9, the radius R of the semi-circle and the groove length define a half-light-receiving angle. R and h satisfy the following relationship:

$$\theta = 2R/h$$

$\theta$ is the half-light-receiving angle of the MP unit, which is 5.7 degrees or less.

Referring to FIG. 6, the pitch p (for example, between the black arrows in FIG. 6) between adjacent light-passing openings in the pinhole film between two adjacent base substrates is p=2R+k, wherein the two adjacent base substrates have a same thickness k. In one embodiment, the first pinhole sub-film and the second pinhole sub-film have a same thickness u. The thickness a of the first pinhole sub-film or the second pinhole sub-film satisfies the following relationship with the radius R. of the semicircular cross section of the groove:

$$R = u.$$

The optical simulation results of the light collimating structure are described below in conjunction with the embodiments.

A minimum half-light-receiving angle $\theta$ that, separates the valley and ridge information exactly is 5.7 degrees. R takes the process limit of 3 um. H is 42 um, k takes the process limit value of 2 um. Then, p is calculated to be 5 um according to equation (3). The parameters R, p, and groove length h of the above design are optically simulated to obtain optical simulation results as shown in FIG. 10.

Figure 10:
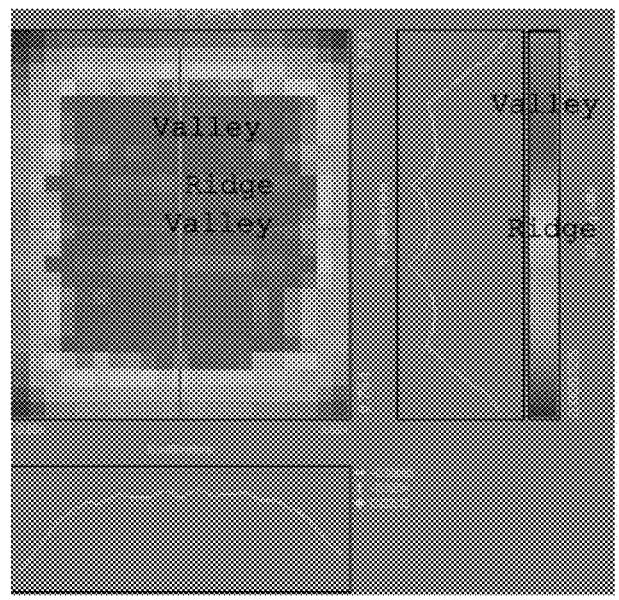
FIG. 10 shows optical simulation results of a light collimating structure shown in FIG. 6.

As shown in FIG. 10, the dark portion corresponds to the valley of the fingerprint, and the light portion corresponds to the ridge of the fingerprint. The dark stripes in FIG. 10 are clearly spaced apart from each other. It can be seen from FIG. 10 that the light collimating structure can extract the light with a small angle out in the way close to collimation. Each ray of the extracted light can be accurately matched with the valley and ridge of the fingerprint, and there is no other stray light crosstalk. As such, accurate identification can be achieved.

Figure 11:
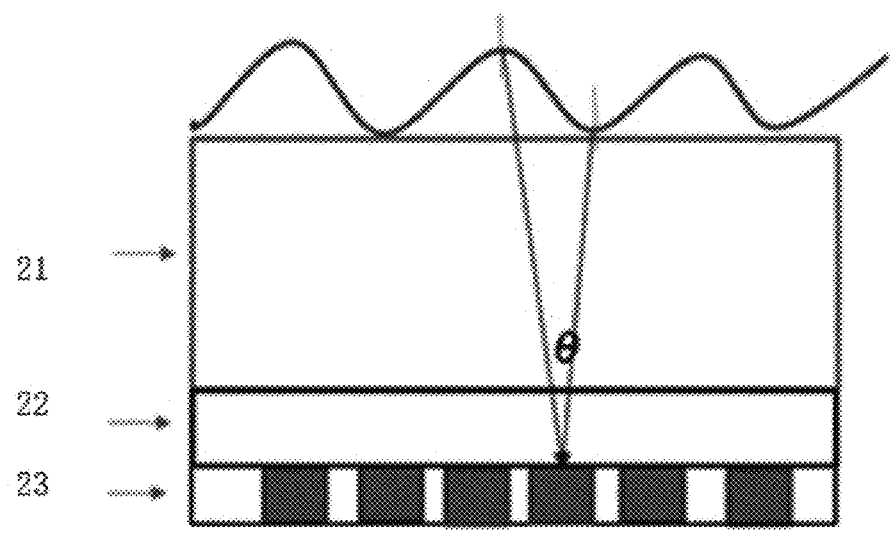
FIG. 11 shows a schematic structural diagram of an optical fingerprint identification apparatus according to one exemplary embodiment of the present disclosure.

FIG. 11 shows a schematic structural diagram of an optical fingerprint identification apparatus according to one exemplary embodiment of the present disclosure. The optical fingerprint identification apparatus includes a light emitting apparatus 21, a light collimating structure 22, and a sensor 23. The light emitting apparatus 21 is configured to emit light when performing fingerprint identification. The emitted light is reflected by the fingerprint. The light collimating structure 22 is disposed under the light emitting apparatus 21 for receiving the light reflected by the fingerprint. The sensor 23 is disposed below the light collimating structure 22 for receiving light transmitted via the light collimating structure.

The light collimating structure 22 can have the structure described in any of the previous embodiments. The principle of the optical fingerprint identification apparatus will be described below with reference to FIG. 11 and FIG. 1.

The light emitting apparatus 21 may be one of various light emitting apparatuses such as an OLED. The OLED may include, from top to bottom, a cover glass, an optically clear adhesive (OCA), a polarizer, a thin film encapsulation (TFE), a cathode, an emission layer (EL), various film layers, a substrate, and a hack plate or the like (not shown).

The sensor 23 may be a sensor array formed by a plurality of sensor units such as a photosensitive sensor array.

The light collimating structure 22 is located on the lower surface of the light emitting apparatus 21 and has the property of extracting optics. In the process of fingerprint identification, when the finger touches the display screen, the light collimating structure 22 can extract out the light of a small angle close to the collimation (that is, extract out the light in the range of the half-light-receiving angle) to make it reach the light sensitive sensor 23 below. The sensor 23 can detect the intensity of the extracted light. The energy of the diffused light reflected from the valley and the ridge is different. Thus, the light intensity detected by the array of the sensors 23 is different, thereby obtaining fingerprint information.

Figure 12:
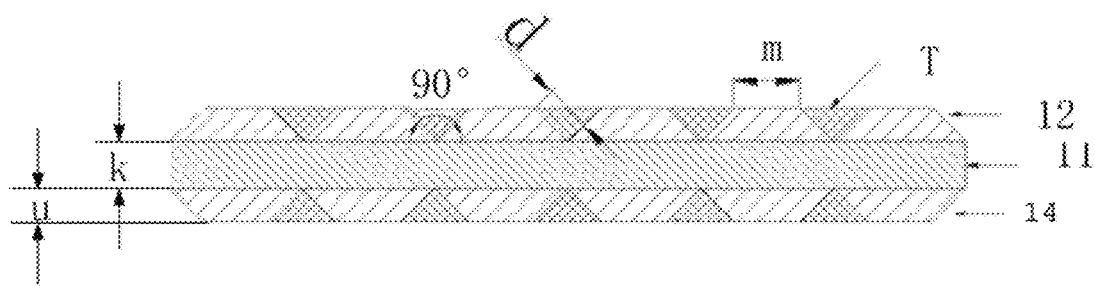
FIG. 12 shows a schematic diagram of a light collimating structure in accordance with one exemplary embodiment of the present disclosure.

FIG. 12 shows a schematic diagram of a light collimating structure in accordance with one exemplary embodiment of the present disclosure. In this embodiment, the first grooves and the second grooves in the pinhole film are filled with a transparent material T. The transparent material T may be, for example, a transparent polyimide (PI) or may be a light-transmitting material having a high transmittance in a certain wavelength range or at a specific wavelength. For example, if the transparent material can allow the light of a certain range of wavelengths to transmit, the light of the range of the wavelengths cannot pass through the pinhole film 10. Filling with the transparent material can prevent leaving impurities such as water vapor or other dusty foreign particles in the grooves to affect transmission of light in the light passing opening.

Figure 13:
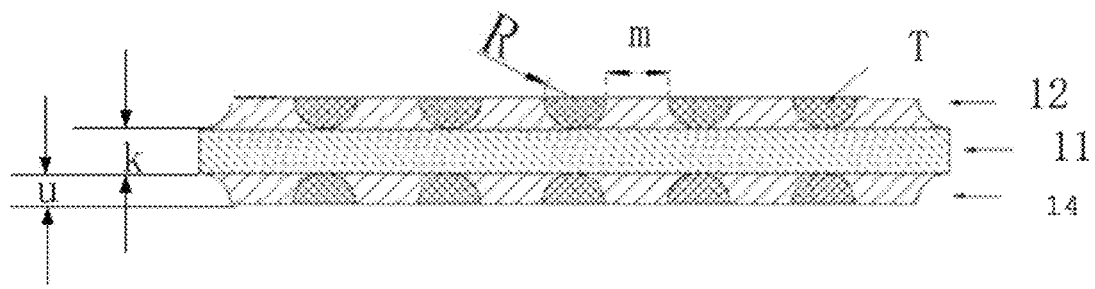
FIG. 13 shows a schematic diagram of a light collimating structure in accordance with one exemplary embodiment of the present disclosure.

FIG. 13 shows a schematic diagram of a light collimating structure in accordance with one exemplary embodiment of the present disclosure. In this embodiment, the groove having a semi-circular cross section is also filled with a transparent material T.

In the technical solution provided by the embodiment of the present disclosure, a first pinhole sub-film and a second pinhole sub-film are attached to both sides of the substrate of each MP unit respectively. The first pinhole sub-film and the second pinhole sub-film are provided with first grooves and second grooves respectively. The first grooves and the second grooves in the pinhole film in adjacent MP units are oppositely disposed to form a light-passing opening. In this way, a specific type of light can be allowed to pass through the plurality of light-passing openings. As such, the function of light collimating can be realized. In addition, the first grooves and the second grooves can be formed by processes such as embossing or exposure techniques. There is no need for a specific process, thereby reducing difficulty of the process.

In the present disclosure, by designing MP units and defining specific dimensions of the MP units, each ray of the extracted light can be accurately matched with the valley and ridge of the fingerprint without any other stray light crosstalk. At the same time, the difficulty of fabricating the MP units in the present disclosure is, low comparing to the structure in the existing optical fingerprint identification. Furthermore, the structure of the present disclosure is lighter and thinner.

Figure 14:
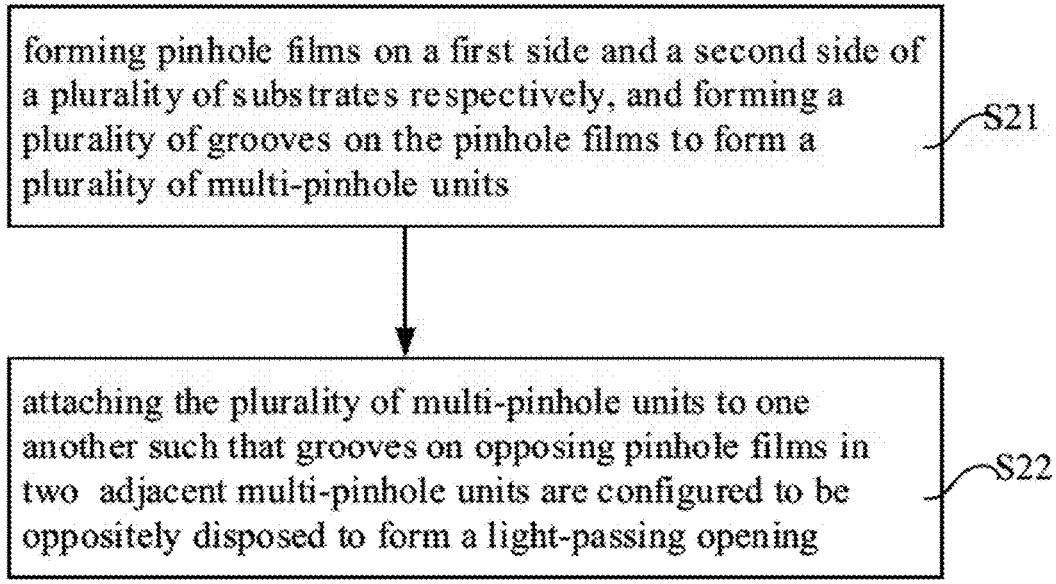
FIG. 14 shows a flow chart of a method of manufacturing a light collimating structure in accordance with one exemplary embodiment of the present disclosure.

FIG. 14 illustrates a flow chart of a method of fabricating a light collimating structure in accordance with one exemplary embodiment of the present disclosure. The method includes steps S21 and S22:

Step S21 includes forming first pinhole sub-films and second pinhole sub-films on a first side and a second side of each of a plurality of substrates respectively, and forming first grooves and second grooves on the first pinhole sub-films and the second pinhole sub-films respectively, thereby forming a plurality of NIP units;

Step S22 includes attaching the plurality of MP units to each other such that the first grooves and the second grooves in the pinhole films in adjacent MP units are oppositely disposed to form light passing openings to allow the light within a half-light-receiving angle range of the MP units to pass through.

Specifically, referring to FIG. 1 and FIG. 2, a first pinhole sub-film and a second pinhole sub-film are first formed on the first side and the second side of the substrate 11 respectively. Then, the first grooves and the second grooves are formed on the first pinhole sub-film and the second pinhole sub-film by, for example, nano-imprinting or exposure techniques to obtain a NIP unit. As described before, a cross-section of the first groove and the second groove may be an isosceles right triangle or a semicircle, etc. Thereafter, the MP units are flipped by 90°, for example, by mechanical robots, as shown in FIG. 4. Then, a black light-absorbing adhesive is applied to the groove wall of the pinhole film on both sides of the substrate shown in FIG. 4. The adhesive is a very thin layer (for example, about 0.1000 angstroms or less) so that it does not affect the light path. Finally, a plurality of MP units is bonded to form the light collimating structure as shown in FIG. 1. The black light-absorbing adhesive may be made of a polyacrylic-based material or a black light-absorbing material and has a very thin thickness (about 1000 angstroms). In addition, it is also possible not to apply an adhesive to the pinhole film such as black PE or black PVC, and the MP units can be bonded together by electrostatic attraction, thereby eliminating the bonding process.

The fabrication of the light collimating structure proposed by the present application can be achieved by the above process steps.

Other embodiments of the present disclosure will e apparent to the skilled in the art from consideration of the specification and the disclosure herein. The present application is intended to cover any variations, uses, or adaptations of the present disclosure, which are in accordance with the general principles of the disclosure and include common general knowledge or common technical means in the art that are not disclosed in the present disclosure. The specification and examples of the present disclosure are to be regarded as illustrative only, and the scope and spirit of the disclosure is pointed out by the appended claims.

What is claimed is:

1. A light collimating structure, comprising:
a plurality of stacked base substrates in a first direction; and
a pinhole film between two adjacent base substrates;
wherein the pinhole film comprises a plurality of light-passing openings in a second direction configured to allow light within a half-light receiving angle to pass through the light-passing openings; and
the pinhole film comprises a first pinhole sub-film and a second pinhole sub-film, the first pinhole sub-film comprises a plurality of first grooves, the second pinhole sub-film comprises a plurality of second grooves, each of the first grooves in the first pinhole sub-film is corresponding to one of the plurality of second grooves in the second sub-film, each of the first grooves and the corresponded one of the plurality of second grooves are oppositely disposed to form one of the light-passing openings.

2. The light collimating structure according to claim 1, wherein a cross-section of each of the first and the second grooves in a plane perpendicular to one of the two adjacent base substrates is in a shape of an isosceles right triangle, the half-light-receiving angle θ satisfies the following relationship:

$$\theta = \sqrt{2}d/h$$

wherein θ is the half-light-receiving angle, d is a leg length of the isosceles right triangle, and h is a groove length in the second direction.

3. The light collimating structure according to claim 2, wherein a pitch between adjacent light-passing openings in the pinhole film between the two adjacent base substrates satisfies the following relationship:

$$p = \frac{1}{\sqrt{2}}d + k$$

wherein the two adjacent base substrates have a same thickness, p is the pitch between adjacent light-passing openings and k is a thickness of one of the two adjacent base substrates.

4. The light collimating structure according to claim 2, wherein the first pinhole sub-film and the second pinhole sub-film have a same thickness u, the pinhole film has a thickness 2u, and u and d satisfy the following relationship:

$$d = \sqrt{2}u.$$

5. The light collimating structure according to claim 1, wherein a cross-section of each of the first and the second grooves in a plane perpendicular to one of the two adjacent base substrates is in a shape of a semicircle, and the half-light-receiving angle θ satisfies the following relationship:

$$\theta = 2R/h$$

wherein θ is the half-light-receiving angle, and R is a radius of the semicircle, and h is a groove length in the second direction.

6. The light collimating structure according to claim 5, wherein the first pinhole sub-film and the second pinhole sub-film have a same thickness u, the pinhole film has a thickness 2u, and u and the radius R of the semicircle satisfy the following relationship:

$$R = u.$$

7. The light collimating structure according to claim 5, wherein a pitch between adjacent light-passing openings in the pinhole film between the two adjacent base substrates is:

$$p=2R+k,$$

wherein the two adjacent base substrates have a same thickness, p is the pitch between adjacent light passing openings, and k is a thickness of one of the adjacent two base substrates.

8. The light collimating structure according to claim 1, wherein the plurality of first grooves and the plurality of second grooves are filled with a transparent material.

9. The light collimating structure according to claim 1, wherein the pinhole film and the plurality of base substrates are made of a black light-absorbing material or a material that absorbs light of a first range of wavelengths, the first range of wavelengths being from 380 nm to 780 nm.

10. The light collimating structure according to claim 1, wherein a layer of adhesive is further between the first pinhole sub-film and the second pinhole sub-film and the first pinhole sub-film and the second pinhole sub-film are attached together by the layer of adhesive.

11. The light collimating structure according to claim 10, wherein the layer of adhesive is made of a black light-absorbing material and has a thickness of about 1000 angstroms or less.

12. The light collimating structure according to claim 1, wherein the pinhole film is made of a material having static electricity, and the first pinhole sub-film and the second pinhole sub-film are electrostatically attached together.

13. An optical fingerprint identification apparatus, comprising:
    a light emitting apparatus, configured for emitting light being reflected by a fingerprint when fingerprinting identification is performed;
    the light collimating structure according to claim 1 under the light emitting apparatus, configured for receiving and transmitting the light reflected by the fingerprint; and
    a sensor below the light collimating structure, configured for receiving the light transmitted via the light collimating structure.

14. A method of manufacturing a light collimating structure, comprising:
    forming a first pinhole sub-film and a second pinhole sub-film on a first side and a second side of each of a plurality of base substrates respectively;
    forming a plurality of first grooves on the first pinhole sub-film and a plurality of second grooves on the second pinhole sub-film of each of the plurality of base substrates to form a plurality of multi-pinhole units; and
    attaching the plurality of multi-pinhole units to one another such that the plurality of first grooves and the plurality of second grooves in two adjacent multi-pinhole units are configured to be oppositely disposed to form a plurality of light-passing openings, thereby allowing light within a half-light-receiving angle to pass through the light-passing openings.

15. The method of claim 14, wherein forming the plurality of first grooves on the first pinhole sub-film and the plurality of second grooves on the second pinhole sub-film to form the plurality of multi-pinhole units comprises:
    forming the plurality of first grooves on the first pinhole sub-film and the plurality of second grooves on the second pinhole sub-film by a nano-imprinting technique or an exposure technique.

16. The method of claim 14, wherein attaching the plurality of multi-pinhole units to one another, comprising:
    providing a layer of adhesive on the first pinhole sub-film and the second pinhole sub-film of each of the plurality of the multi-pinhole units; and
    attaching the plurality of multi-pinhole units together by the layer of adhesive.

17. The method according to claim 14, wherein the pinhole films are made of a material having static electricity; and
    attaching the plurality of multi-pinhole units to one another comprises: attaching the plurality of multi-pinhole units together by the static electricity of the pinhole films.

18. The method according to claim 14, wherein a cross-section of each of the plurality of first grooves and the plurality of second grooves in a plane perpendicular to the plurality base substrates is in a shape of an isosceles right triangle or a semicircle.

19. The method according to claim 14, further comprising:
    filling the plurality of first grooves and the plurality of second grooves with a transparent material.

* * * * *